United States Patent [19]

Dequesnes et al.

[11] Patent Number: 4,704,539
[45] Date of Patent: Nov. 3, 1987

[54] APPARATUS FOR THE TRANSPORTATION, POSITIONING AND SEALING OF A CONTAINER FOR RECEIVING IRRADIATED FUEL FROM BENEATH A LOADING PIT IN A NUCLEAR INSTALLATION

[75] Inventors: Pierre M. A. Dequesnes; Jean-Claude Franceschi, both of Toulon; Sylvain Bartolo, Ollioules, all of France

[73] Assignee: Constructions Navales et Industrielles de la Mediterranee, La Seyne Sur Mer, France

[21] Appl. No.: 814,961

[22] Filed: Dec. 31, 1985

[30] Foreign Application Priority Data

May 15, 1985 [FR] France .................................. 85 07427

[51] Int. Cl.$^4$ .......................... G21F 5/00; G21C 19/32
[52] U.S. Cl. .................................. 250/506.1; 376/261; 376/272; 414/146; 414/411; 410/2; 105/238.1
[58] Field of Search ............... 376/272, 261, 341, 342, 376/260; 250/506.1, 507.1, 505.1; 414/146, 411, 495; 410/2, 156; 105/238.1

[56] References Cited

U.S. PATENT DOCUMENTS

| | | | |
|---|---|---|---|
| 3,838,289 | 9/1974 | White | 376/272 |
| 4,310,034 | 1/1982 | Guilloteau et al. | 376/272 |
| 4,356,062 | 10/1982 | Bosshard | 376/272 |
| 4,450,134 | 5/1984 | Soot et al. | 376/272 |
| 4,481,165 | 11/1984 | Anderson et al. | 376/272 |

FOREIGN PATENT DOCUMENTS

| | | |
|---|---|---|
| 2725694 | 1/1979 | Fed. Rep. of Germany . |
| 2730812 | 1/1979 | Fed. Rep. of Germany . |
| 2836955 | 3/1980 | Fed. Rep. of Germany . |
| 2317737 | 2/1977 | France . |
| 2496323 | 6/1982 | France . |
| 1234020 | 6/1971 | United Kingdom . |

Primary Examiner—Deborah L. Kyle
Assistant Examiner—Daniel Wasil
Attorney, Agent, or Firm—Wenderoth, Lind & Ponack

[57] ABSTRACT

An apparatus for transportation, positioning and sealing a container used for receiving irradiated fuel from beneath a loading and unloading pit of a nuclear installation including a cart which is successively brought through a hall underneath a loading preparation station, underneath a removal station for removing the plug from the container, and underneath a penetration shaft providing the connection between the loading and unloading pit and the hall where the cart travels. The cart includes a framework placed on a rolling platform with a sliding and rolling support therebetween, and guided between side rails on the walls of the hall. The container is placed within the framework and on a plate provided with a mechanism adjusting the height and levelness of the upper face of the container, the positioning of the container with respect to transverse and longitudinal axes taken in a horizontal plane passing through the framework and the container being obtained with the assistance of the jig fixed on the container frame and cooperating with reference axes located on the top of the cart. Armored protection plates are provided on the framework of the cart for reducing the radiations during the container loading operations, and fluid tightness between the loading and unloading pit and the container is maintained by a metallic bellows.

13 Claims, 16 Drawing Figures

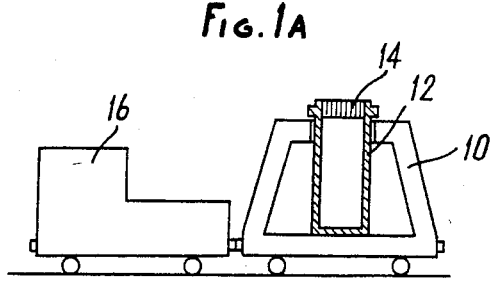
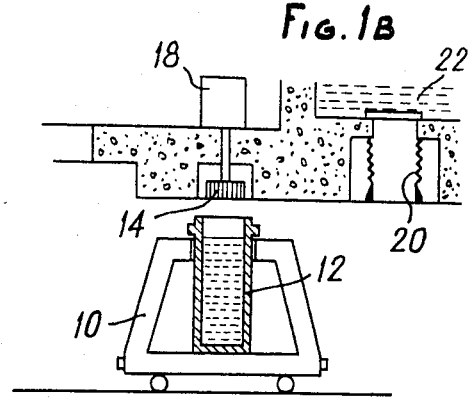
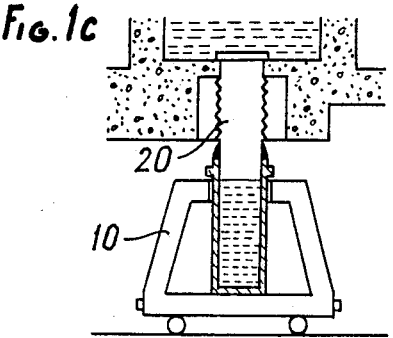
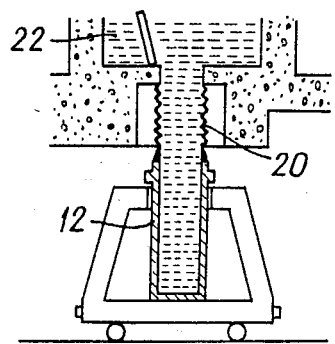
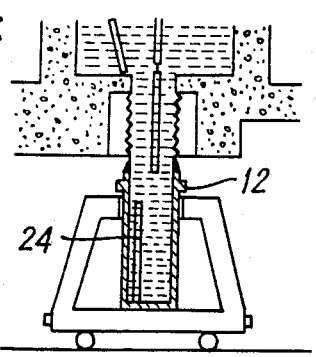
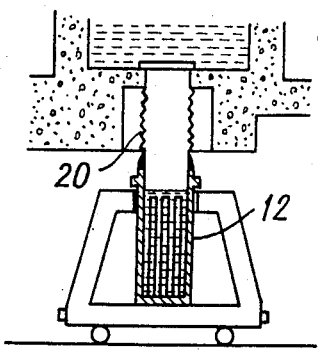
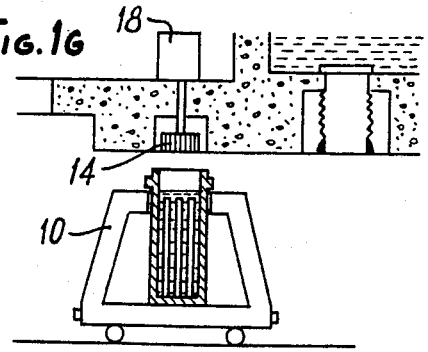
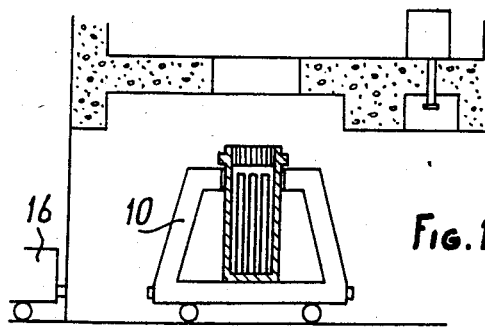

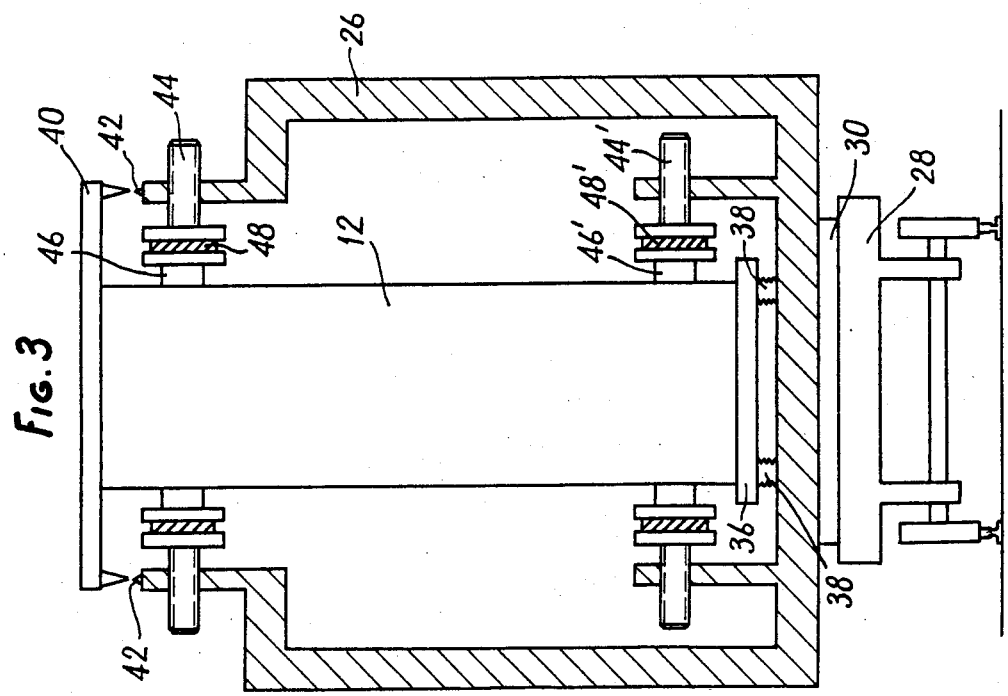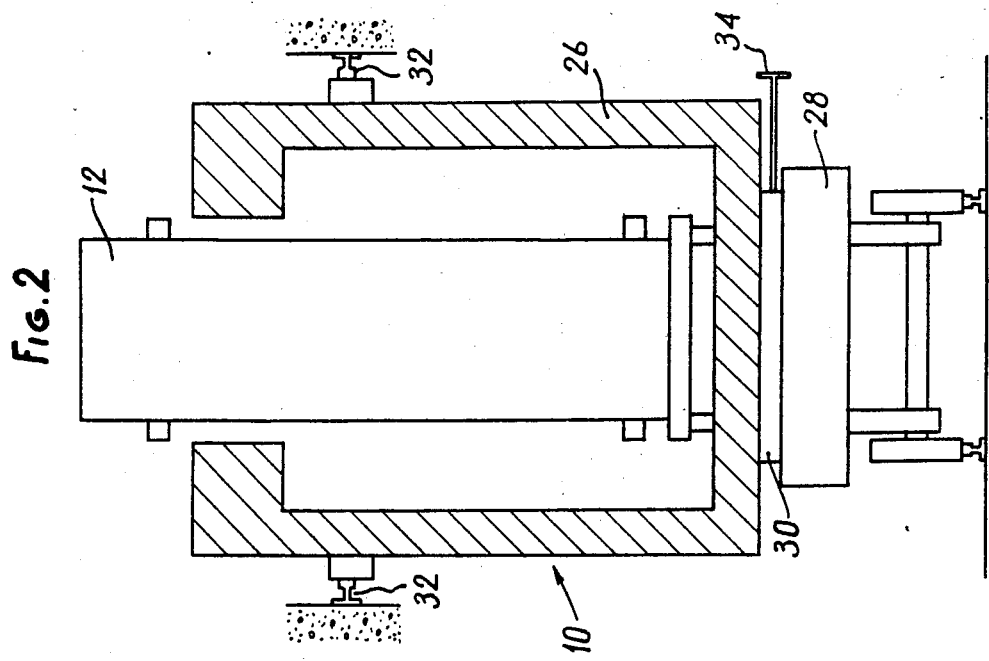

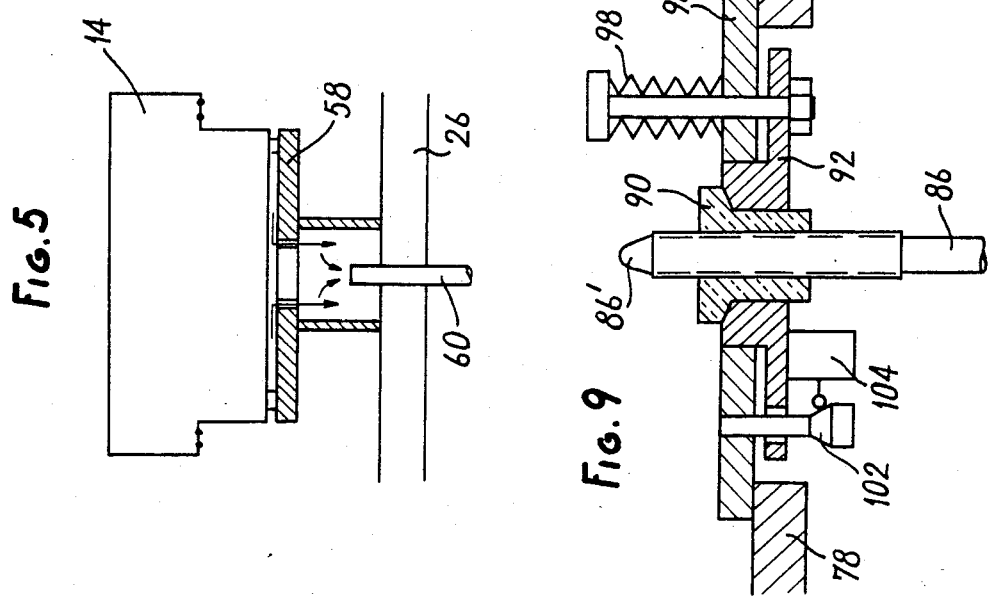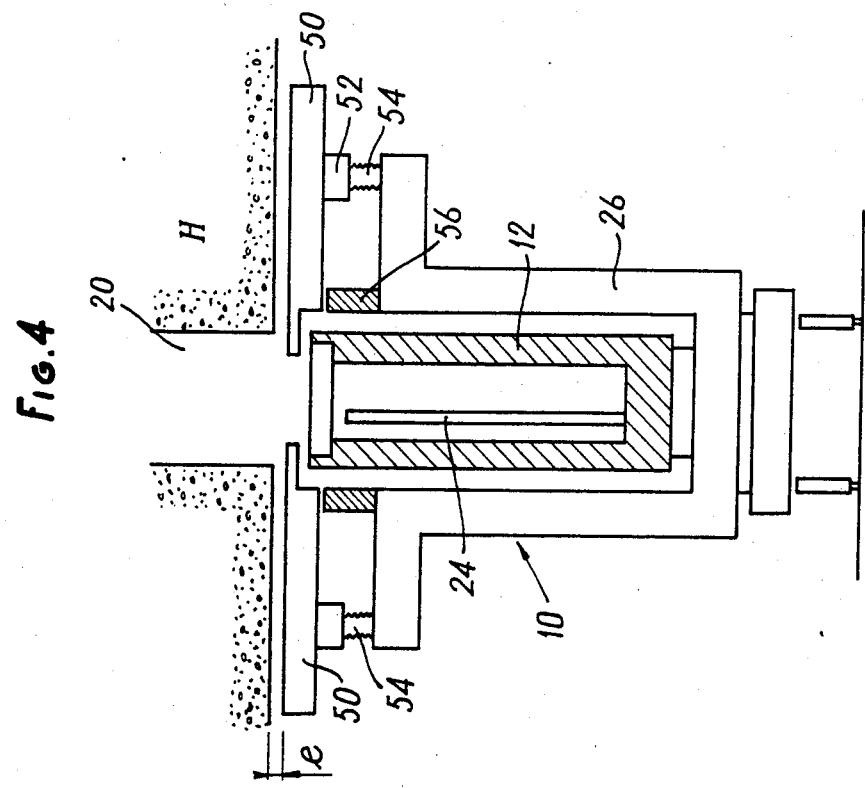

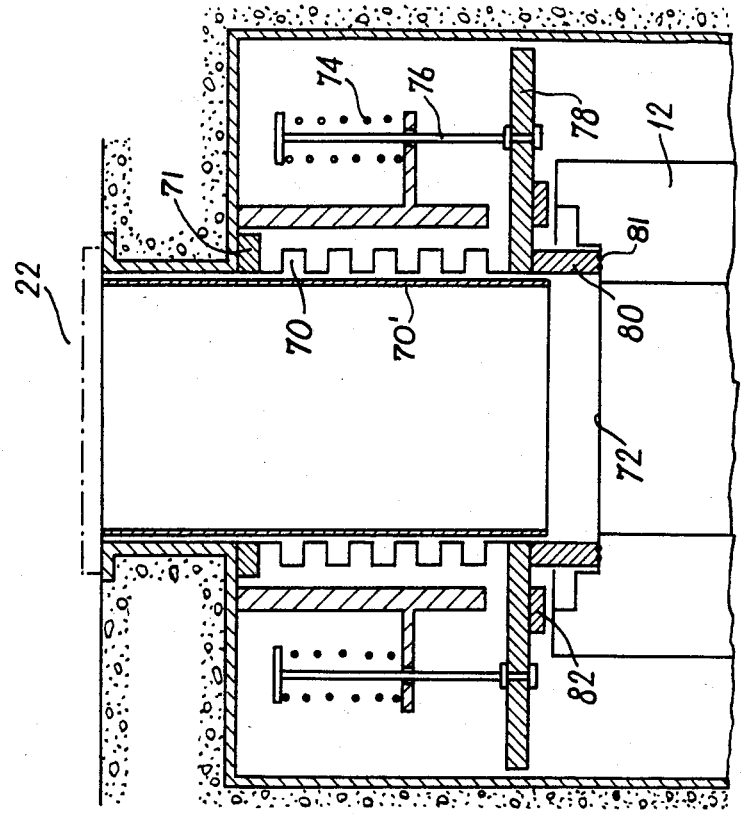
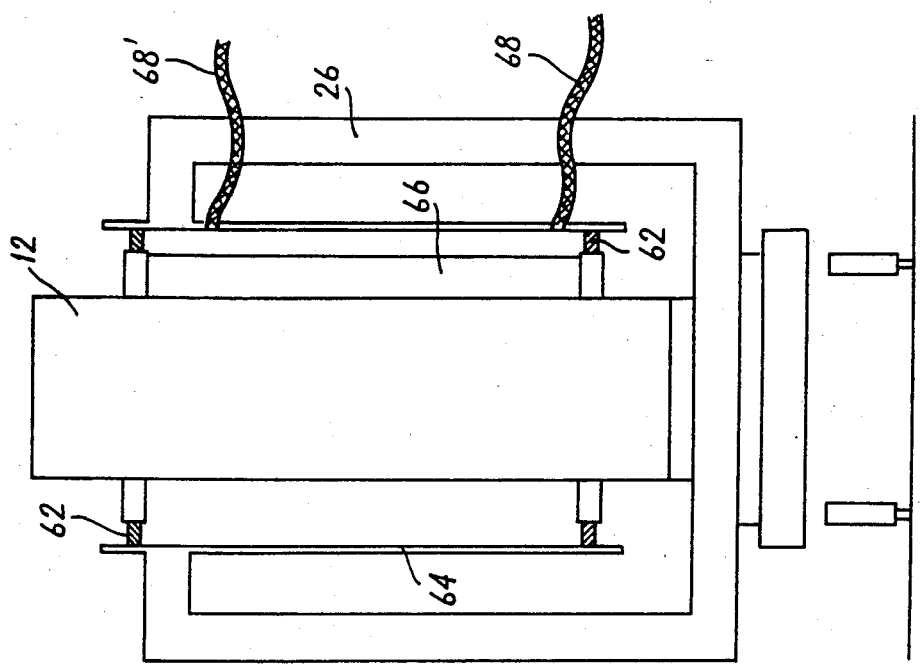

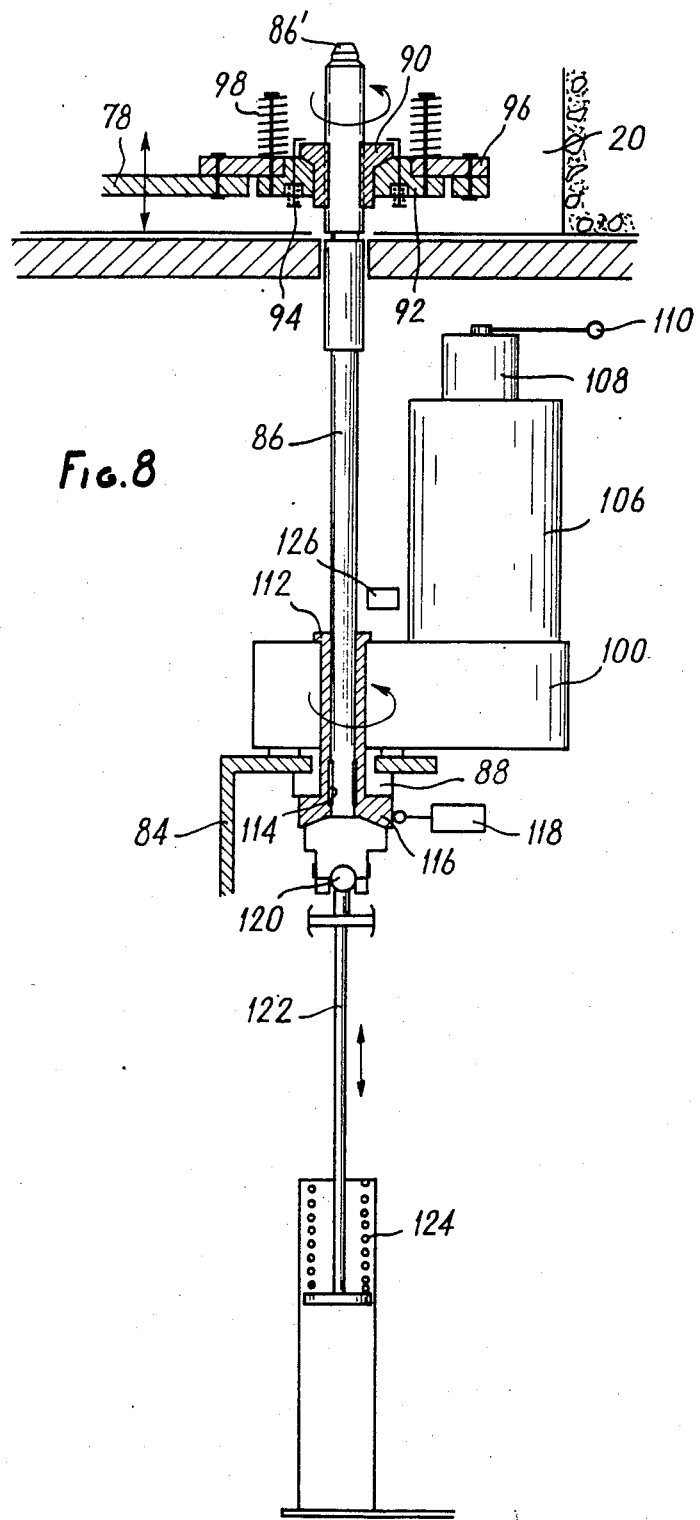

APPARATUS FOR THE TRANSPORTATION, POSITIONING AND SEALING OF A CONTAINER FOR RECEIVING IRRADIATED FUEL FROM BENEATH A LOADING PIT IN A NUCLEAR INSTALLATION

BACKGROUND OF THE INVENTION

Field of the Invention

The present invention relates to a loading and/or unloading device for containers of irradiated fuel of a nuclear reactor or of a reprocessing unit of irradiated fuel, and it is more particularly concerned with the container transportation device, its positioning and sealing system underneath an unloading and/or loading pit, and to the traversing of the bottom of the pit of such a nuclear installation.

In order to make clear the problems solved by the device according to this invention, reference is first made to FIGS. 1A through 1H which illustrate schematically the various steps of a container loading operation. In these Figures, one sees at 10 a cart carrying the container 12 provided with a tight plug 14, said cart being moved outside the installation by a locomotor 16. Inside the installation, it is self-propelled, which allows bringing it in succession underneath a system 18 providing the removal of plug 14 and underneath a penetration shaft 20 acting as a lock with a pit or cell 22.

A loading operation includes the following steps:
1—bringing the container carrying cart to the removal station of plug 14 (FIG. 1B), after having previously passed through a preparation station; then
2—moving the cart underneath penetration shaft 20 (FIG. 1C), in order to provide a path between pit 22 containing the irradiated fuel 24 and container 12, previously filled with water (FIG. 1D);
3—the loading of container 12 with irradiated fuel 24 (FIG. 1E) is then carried out, then the container 12 is separated from pit 22, followed by the emptying of penetration shaft 20 (FIG. 1F); and finally
4—the cart is transferred underneath the fitting and removal station of plug 14 (FIG. 1G), for resetting the sealing plug in position, followed by the carrying away of the loaded container (FIG. 1H).

The invention proposes a number of improvements to the various means used in this installation.

OBJECT AND SUMMARY OF THE INVENTION

Therefore, the object of the invention is to provide an apparatus for transportation, positioning and sealing a container used for receiving irradiated fuel underneath a loading and/or unloading pit of a nuclear installation, of the type in which a container is disposed on a cart which is successively brought underneath a loading preparation station, underneath a removal station for removal of the plug from the container, and underneath a penetration shaft providing the connection between said loading and/or unloading pit and the hall beneath said pit where said cart travels, said apparatus being characterized in that said cart is made of a framework placed on a rolling platform via a sliding and/or rolling support, and guided by side rails between the cart and the hall, and in that said container is placed on said framework via a plate provided with means for adjusting the height and levelness of the upper face of said container, the positioning of the latter with respect to transverse and longitudinal axes taken in a plane passing through the framework and the container, being obtained with the assistance of a jig fixed on the container frame and cooperating with reference axes carried by the top of the cart, and in that armored protection plates are provided for reducing the radiations, during the container loading operations, and in that the fluid tightness between said loading and/or unloading pit and the container is maintained by a metallic bellows providing the continuity of the fluid tightness at the level of the bearing surface of the container on which the plug is received.

BRIEF DESCRIPTION OF DRAWINGS

Other features and advantages of this invention will become more apparent from the description which follows, with reference to the accompanying drawings illustrating various embodiments thereof, without any limiting character, and in which:

FIGS. 1A through 1H illustrate the previously described main loading operation steps of the container, FIG. 2 is a front sectional schematic view of the container-holder cart, FIG. 3 is a sectional schematic view showing the positioning device of the container on its cart, FIG. 4 is a front sectional schematic view of the biological protections on the cart, FIG. 5 is a sectional view of the container plug support trestle, FIG. 6 is a sectional view of the container cooling means, FIG. 7 is a sectional view of the penetration means accosted by the container, FIG. 8 is a schematic illustration of the accosting device, and FIG. 9 shows the effort limiter of the accosting mechanisms.

DETAILED DESCRIPTION OF THE INVENTION

Reference is first made to FIGS. 2 and 3 showing cart 10 providing the transportation of container 12 to the various stations illustrated in FIGS. 1A through 1H.

Said cart 10 is substantially made of a framework 26, placed on a rolling platform 28 via a sliding and/or rolling support 30 therebetween, designed such as to allow a limited displacement perpendicular to the rolling direction of the platform, between framework 26 and said rolling platform 28, during the introduction of cart 10 in a loading hall for receiving a container 12. Due to this feature, the cart can travel on running paths of the railway track type, with the necessary clearances for accommodating the stresses (radius of curvature, cant of the track, etc.) as well as on running paths made and mounted with accuracy, provided in the loading hall where the cart travels. The lateral centering is provided by side guiding rails 32 located on the walls of the hall and locking means 34 are provided, designed so as to allow or suppress the side motion freedom according to whether the cart is outside or inside the hall.

Container 12 is positioned on the framework 26 of the cart via a plate 36 on which it is placed (FIG. 3) and which comprises means 38, for example jacks, for adjusting the height and levelness of the upper face on the container. The positioning of container with respect to the longitudinal and transverse axes thereof is obtained by a jig 40, fixed on the top of container 12, and cooperating with reference axes 42, 42 located on the upper portion of the cart framework 26, while setting means are provided for positioning the container 12 in the cart 10. In this embodiment, said setting means are in the form of screw-nut systems 44, 44' such as threaded shafts extending inwardly from opposite sidewalls of the framework 26 are respectively placed in register with the upper 46 and lower 46' support stubs on opposite sides container 12. According to the invention, the screw-nut systems 44, 44' not only ensure the container positioning, but they also maintain it in position and resist efforts to move it even due to an earthquake. Finally a resilient bumper system 48, 48', interposed between each support stub of the container and each screw-nut system, allows accomodation of displacement due to the radial expansion of the container, caused by heating, once the container has been loaded with irradiated fuel.

During translation of the cart from the penetration shaft 20 (FIG. 1C) to the station for reinserting the container plug (FIG. 1G), it is necessary to provide protection against radiations emitted by the irradiated fuels loaded in the container, said container being then without its sealing plug. This radiation protection, according to another feature of this invention, is provided by a pair of movable armored protection plates shown schematically at 50 (FIG. 4) mounted on the upper platform of the framework 26 of cart 10 in such manner that a minimal distance e is obtained between the ceiling of the loading hall H and said protection plate 50, the value of said minimal spacing being set by a known mechanical device such as jacks 54 for example. According to the invention, said armored protection plates also allow reducing the radiations from the irradiated fuel when the latter is moved through penetration shaft 20, during loading of the container (station of FIG. 1E). According to the invention, the armored protection plates are provided with manual or mechanized control means, shown schematically at 52, allowing movement of the plates towards or away from each other, so as to close them against each other or in order to load and unload the container from the cart. The armored protection plates 50 fit against each other and cover in part the upper face of container 12, a clearance between the plates and the upper face container being provided for accommodating a vertical expansion of the container, due to its heating after having received the fuel. An extra armored protection can also be provided against the radiations, shown schematically at 56, fixed either on container 12 or on the framework 26 of the cart, or integrated to said framework, in order to complete a radiation shield at the top of the container when the container plug is removed.

According to another feature of the invention (FIG. 5), there is provided a support trestle 58 for the container plug 14, said trestle being disposed on the cart framework 26. Trestle 58 allows depositing the container plug on the cart once it has been removed from the container, during the period when the latter is underneath the penetration shaft 20. This feature obviates having the sealing plug suspended during the container docking and loading operations, and facilitates checking and possibly changing the plug seals. According to the invention, it is possible to provide suction means such as a sucking device 60, on support trestle 58 (FIG. 5) for avoiding any discharge or dissemination of the contamination of the plug lower face.

According to the invention, all the mechanisms of the cart, of the penetration shaft and for the plug removal are designed so as to be adaptable to the various types of containers, by a simple addition of adapters, allowing compensation for the differences in dimensions thereof and the needed protection from radiation.

For safety reasons, notably in the case of an incidental shutdown of the installation, after the loading of a container with irradiated fuel, it is necessary to cool down said container. To this effect (FIG. 6), the invention provides a cooling device for container 12, comprising a tubing 64, integrated with or fixedly attached to the cart framework 26, and which covers the container over the entire height of its cooling fins 66, the cooling being provided by water circulating in the space between tubing 64 and the container, said circulation being provided by flexible ducts 68, 68'. The lower and upper fluid tightness of the tubing on the container is provided by standard seals 62.

The fluid continuity of the tightness between the loading or unloading pit or tank 22 and container 12 is provided by means of a conventional metallic bellows 70 (FIG. 7) which is concentric with a sleeve 70' extending downwardly from the loading pit 22, the bellows 70 being held at an upper end thereof by a flange 71 connected to the underside of the loading pit 22. According to the invention, the fluid tightness is provided between the bellows 70 and container 12 at the level of the bearing surface 72 of the latter which receives the plug, in order to avoid any contamination of the upper part of said container.

The system for maintaining the bellows is disclosed in French Pat. No. 80 26 360 filed on Dec. 12, 1980 and published under No. 2 496 329 in the name of the assignee of the present invention. This system includes a series of springs 74 maintaining the bellows 70 in its idle position, by exerting an upward force on shafts 76 the respective lower ends of which are rigidly connected to a flange 78, so-called movable abutment flange, which provides the connection between a gasket carrying flange 80 and the bellows lower end. According to the invention, the metallic bellows 70 can be disassembled from the bottom, without it being necessary to disassemble the springs 74 and flange 78, by disassembling a lower flange 82 maintaining the whole system in position.

With reference to FIG. 8, a description will now be given of a bellows engaging means which, in this embodiment, are mounted on a tubing 84 of cart 10 and which allow, once the cart is positioned underneath penetration shaft 20, to engage the bellows 70 and pull it downwardly in order to hold gaskets 81 on the gasket carrying flange 80 against container upper bearing surface 72 and to ensure the fluid tightness provided by the bellows. Said bellows engaging means, which are similar to those disclosed in the hereabovementioned French patent, comprise four assemblies identical to that shown in FIG. 8, it being understood that their number can vary as a function of the efforts which have to be exerted for pulling the bellows.

Each assembly includes a treated steel screw shaft 86, provided with an frustoconical insertion end 86', the lower end of said screw being provided with a roll or roller abutment 88 accommodating the axial stress. Each screw 86 cooperates with a spherical collar nut 90 provided on the movable abutment flange 78. In the embodiment shown here, each spherical collar nut 90 is held within a base 92 with prevents the collar nut 90 from rotation being rotated, while leaving a clearance affording a sufficient freedom for the motion of the collar nut 90. Each collar nut 90 is applied on base 92 by springs 94 exerting a slight pressure on the collar nut, for facilitating easy engagement of screw 86 at the beginning of the screwing operation, described below. Base 92 is mounted on an adjustment flange 96 via resilient devices, made here of spring washers 98 having a double function:

1—to protect step-down gears 100 of a driving mechanism for screws 86, described below, when stopped in mechanical abutment, and 2—provide a free expansion of the container while remaining locked, without introducing a new excessive stress in the system.

The adjustment flange 96 also allows positioning of the axis of nut 90 with respect to the axis of screw 86, the cart serving as a jig.

According to the invention, the screw devices hereabove described are designed so as to accommodate a large offset between the axis of nut 90 and that of screw 86 in order to obtain a greater freedom of positioning of the cart underneath penetration shaft 20. To this effect, the collar of nut 90 is designed so as to allow a displacement of the cart of at least 4 mm with respect to the penetration shaft, when there is an earthquake, while still ensuring the thighness.

Still according to the invention (FIG. 9), the resilient mounting devices for collar nuts 90 formed by the spring washers 98 are used as a force limiting system at the contact between the gasket carrying flange 80 collar 96 and the container 12, by measuring the relative displacement between the adjustment flange 96 and the base 92. To this effect, the invention provides cam means, such as a cam 102, mounted on the adjustment flange 96, and an electrical contact 104 on the base 92, for the detection of said relative displacement (of course, a reverse disposition can also be envisaged without departing from the scope of the invention by mounting cam 102 on base 92 and contact 104 on flange 96). The relative displacement thus detected corresponds to the force exerted between the container 12 and the bellows 70''; due to the compression effected by the screw device. Each screw 86 stops turning in a locked position due to the information provided to suitable control means by the electrical contact 104 operated by cam 102.

Each screw 86 is driven in rotation by a motor 106 and a step-down gear 100 unit, said motor/step-down gear unit comprising a braking system 108 with manual unlocking 110. The driving of screw 86 is obtained via a sheath 112 keyed to the step-down gears 100, there being two grooves and two keys 114 providing a rotating connection between screw 86 and the sheath 112. The latter is guided by a hollow shaft of the step-down gear 100 and it comes to bear against the ball or roller abutment 88, fixed onto the tubing 84 of the cart, thereby allowing introducing all the axial efforts into the cart, and thereby protecting the step-down gear.

The sheath 112 provides the angular adjustment of the first thread of screw 86 via a cam 116 and an electrical device 118, the synchronous motor 106 providing the rotation motion. The lower end of screw 86 is fixed by an articulated connection 120 at the end of the shaft 122 of a double action pneumatic jacket 124. The hereabove described system being identical to the corresponding system disclosed in the aforementioned French patent, its operation will not be described and the reader is invited to refer to the corresponding description of said prior patent.

According to the invention, a revolution counting device 126 is provided for each screw system, such as adjacent screw 86, for detecting and signalling a possible lack of synchronization of the rotation of the screw systems, any lack of synchronization of one of the screw systems causing the stoppage of all the screws.

According to the invention, when an incident occurs on a screw, it is possible to put out of order the screw which is diametrically opposite thereto and to go on operating all the other screws, either for locking them to obtain the fluid tightness, or for unlocking them in order to remove the container from the penetration shaft.

According to the invention, an emergency manual control can be provided, which can be coupled to each screw so as to be able to effect a manual coupling or uncoupling thereof.

Finally, according to the invention, when a screw is jammed in a corresponding nut, it is possible to cut off the jammed screw underneath the armored protection plates, said system being such that after disconnecting the bellows from the container the portion of the screw which is jammed in the nut does not prevent the translation of the container on its cart, and therefore a resetting of the system in a "safety" position is possible.

Obviously, this invention is not limited to the various embodiments described and shown, and it encompasses all possible variations thereof.

What we claim is:

1. An apparatus for transporting, positioning and sealing a container used for receiving irradiated fuel from beneath a loading and unloading pit of a nuclear installation, comprising:

a cart including a framework, a rolling platform and means therebetween for adjusting the position of said framework relative to said rolling platform in a direction perpendicular to a direction of movement of said cart;

means disposed within said framework for supporting a container used for receiving irradiated fuel, said support means being adjustable to raise and lower the container supported thereon and being adjustable to maintain levelness of an upper surface of the container; and setting means disposed within said framework for positioning the container supported therein, said setting means extending between said framework and an outer periphery of the container for adjusting the position of the container with respect to a longitudinal axis and a transverse axis taken in a horizontal plane passing through said framework and the container.

2. The apparatus of claim 1, further comprising means for reducing radiations during loading of the container with irradiated fuel, said means including a pair of armored protection plates movably mounted on opposite sides of an upper portion of said framework, said plates being movable towards each other to close an opening into the container and movable away from each other to allow loading and unloading the container.

3. The apparatus of claim 2, wherein means are provided on said framework for moving said plates in a direction away from said upper portion of said framework for spacing said plates a desired distance from a lower surface of the unloading pit.

4. The apparatus of claim 1, wherein said setting means comprises threaded shafts extending from opposite sidewalls of said framework and engaging the container for movement thereof by rotating said shafts, and said framework includes reference axes disposed on an upper surface thereof cooperative with a jig placed on the container for accurate positioning of the container on the cart by adjusting the setting means.

5. The apparatus of claim 1, wherein said means adjusting the position of said framework comprises a movable support between said framework and said rolling platform and locking means for setting said movable support in a desired position with respect to said rolling platform.

6. The apparatus of claim 4, wherein resilient bumper means is provided between each of said screw shafts and the container for allowing thermal expansion of the container which occurs when the container is loaded with irradiated fuel.

7. The apparatus of claim 1, further comprising means for reducing radiation during loading of the container with irradiated fuel, said means including armored protection fixedly mounted on a part of said framework adjacent the top of the container, said armored protection providing a radiation shield at the top of the container when a plug used to seal the container is removed.

8. The apparatus of claim 1, further comprising a support trestle means disposed on said framework of said cart for supporting a plug removed from the top of the container supported within said framework, said support trestle means including suction means disposed adjacent the lower face of the plug for avoiding discharge of contamination on the lower face of the plug.

9. The apparatus of claim 1, further including means for cooling the container supported within said framework of said cart, said cooling means including tubing disposed within said framework and surrounding the outer periphery of the container over the entire height of cooling fins disposed on the container and sealing means between said tubing and the outer periphery of the container to provide for circulation of water in a space therebetween.

10. The apparatus of claim 1, further including means to engage a bellows disposed beneath the loading pit, said bellows engaging means being operable to pull the bellows towards said cart and in contact with a surface of the container to maintain fluid tightness between the bellows and the interior of the container, said bellows engaging means including rotatable screw shafts having free ends facing cooperative means associated with the bellows for engagement therewith when said screw shafts are moved into contact with the cooperative means and rotated to pull the bellows towards the container and said bellows engaging means further including means for rotating each of said screw shafts.

11. The apparatus of claim 10, wherein said bellows engaging means includes counter means associated with each of said screw shafts for detecting and signalling lack of synchronization of the rotation of said screw shafts whereby rotation of said screw shafts can be terminated upon detection of lack of synchronization of said screw shafts.

12. The apparatus of claim 10, wherein said bellows engaging means includes locking force limiting means associated with the bellows for detecting the surface of the container which is brought into contact with the bellows, said locking force limiting means including resilient mounting devices supporting collar nuts on the bellows each of which are engaged with a respective one of said screw shafts, cam means and electrical contact means disposed on the bellows and resilient mounting devices and cooperative with each other to detect relative displacement between the bellows and the resilient mounting devices corresponding to a force exerted between the container and the bellows due to engagement therebetween as a result of rotation of said screw shafts.

13. The apparatus of claim 10, further comprising an emergency manual control coupled to each of said means for rotating said screw shafts whereby the bellows and the container can be brought into engagement or separated from each other manually.

* * * * *